(No Model.)
J. B. NOBLE & C. G. THOMSON.
LIFE SAVING GRAPNEL.
No. 508,234.     Patented Nov. 7, 1893.
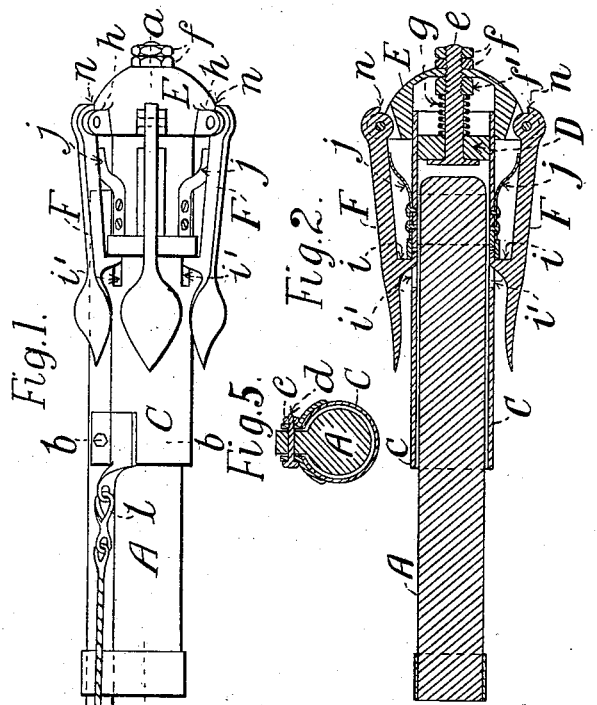
Witnesses
Wm Davies
Arthur T. Davies
Inventors.
James Blackwood Noble.
and Charles George Thomson.
per. Herbert Priest Blake.
Attorney.

UNITED STATES PATENT OFFICE.

JAMES BLACKWOOD NOBLE AND CHARLES GEORGE THOMSON, OF SOUTHAMPTON, ENGLAND.

LIFE-SAVING GRAPNEL.

SPECIFICATION forming part of Letters Patent No. 508,234, dated November 7, 1893.

Application filed March 28, 1893. Serial No. 468,034. (No model.)

*To all whom it may concern:*

Be it known that we, JAMES BLACKWOOD NOBLE and CHARLES GEORGE THOMSON, subjects of the Queen of Great Britain, residing at Southampton, in the county of Hants and Kingdom of England, have invented certain new and useful improvements in apparatus for use in establishing communication between a stranded ship and the shore for life-saving purposes; and we do hereby declare the following to be a full, clear, and exact description of the invention, such as will enable others skilled in the art to which it appertains to make and use the same.

Our invention relates to marine life saving apparatus and the main object of our said invention is to provide simple and efficient apparatus by means of which communication can be established between a stranded ship and the shore for life saving purposes.

Our improved apparatus will be so constructed that it can be readily adjusted, fixed upon, and impelled by a rocket of a kind known as a "Boxer" service rocket, now used as the means for throwing a line, or lines from the shore to, or over a stranded vessel for life saving purposes.

In the accompanying drawings, Figure 1 is a side elevation of an apparatus constructed according to one form or modification of our invention, and fitted upon a Boxer rocket; Fig. 2 a sectional plan taken on line $a.a.$; Fig. 3 a plan; Fig. 4 an end view; Fig. 5 a cross section taken on line $b.b.$; Fig. 6 a plan view illustrating a detail hereinafter described.

Like letters of reference indicate corresponding parts throughout the drawings.

A, is the Boxer rocket; B, B, parts of the rocket stick attachment which will be of the usual length.

C, is a tube forming a sleeve, of a size that will permit of its being passed over the rocket A, fitting nicely upon same, and to which it is secured by means of the nut and screw bolt $c$, $d$, or other suitable means.

D, is a diaphragm forming part of, or suitably secured in position in the tube C.

E, is a cap or cover fitted over the end of the tube C, in such a manner as to allow of its free movement backward and forward on the tube end to a limited extent; the cap E, is connected to the tube C, by the bolt $e$, which is passed through the diaphragm D, and set up on the head of cap by a nut or nuts $f, f$, or other suitable means. A nut $f'$, is also provided on the bolt $e$, at the inside of cap for the purpose hereinafter more fully described, and between this nut $f'$, and the diaphragm D, a spiral spring $g$, is fitted which embraces the bolt $e$.

F, F, are arms with grapnel or fluke shaped ends. The arms pivot between lugs $h, h$, which form part of, or are attached to the cap E on the outside of same. We have shown on the drawings six such arms but a greater or less number may be fitted as desired. The said arms are arranged to fold down upon, and connect to the sides of the tube C, in manner as shown at Figs. 1, and 2. To complete the connection, the cap E, must be pushed down on the tube C, until the hook projections $i, i$, pass into the openings $i', i'$. Meanwhile the spring $g$, is compressed and upon releasing the thrust upon the cap E, it springs back locking the hook projections of the various arms in their respective openings $i', i'$, in which they are held until the cap is again pushed down on the tube.

To prevent the cap rotating on the tube, the bolt $e$, is made flat sided where it works backward and forward in the square hole in the diaphragm. Thus the hook projections on the various arms are always kept in line with their respective openings or recesses in the sides of the tube. The position of cap lengthwise of the tube,—and consequently of the arms and their hook projections in relation to the openings in the tube,—can always be nicely adjusted by means of the nuts $f, f$, and $f'$.

Under each arm a plate, or other suitable spring $j$, is fitted, and when the arms are folded to the sides of the tube these springs are in compression.

When it is desired to establish communication between a ship and the shore, our apparatus—with the arms folded and locked in the sides of tube C,—is adjusted and fixed upon the rocket, the stick B, fitted to same, the bridle $k$, connected to the tube C, by a clip hook—or other suitable—connections $l. l.$ and the line $m$, to the bridle and also the stick B if desired; placed in a suitable stand and the rocket fired the apparatus with the attached line is carried by the rocket in its flight to the shore.

Upon the head or cap E, of the apparatus striking the shore or beach, or other object, it is pushed back upon the tube C, by reason of the force of impact, thereby releasing the hook projections *i, i*, from their engagement with the openings *i', i'*, in the sides of the tube; the arms being thus freed, they are forced outward by means of their respective springs *j, j*, into the expanded position shown at Fig. 3. The extent to which they may be opened out is regulated by a stop *n*, provided on the pivoted end of each arm.

The apparatus with the arms in this expanded position forms a complete grapnel, and upon hauling upon the line attached to the apparatus the latter becomes embedded in the shore or soil, as would an anchor or grapnel; communication being thus established between the ship and the shore or place where the grapnel is embedded.

In attaching the line *m*, to our apparatus we prefer to use the wire bridle *k*, and to connect the line to the eye *p*, of the bridle only, but we may sometimes attach the line *m*, both to the bridle and to the rocket stick or rocket. In the latter case should the backfire of rocket destroy the line where connected to the tube, or the stick be broken, the line would still be attached to the apparatus by means of its connection to the bridle; as the latter, being made of wire, would not be destroyed by the backfire. We may sometimes attach a block *q*, (see Fig. 6,) to the eye *p*, of bridle through which the line will be rove thus forming a whip or double part. In this arrangement the line *m*, will not be attached to the rocket, or its stick.

The apparatus is so balanced that when fixed upon a rocket, with its stick, and fired it will when coming to the ground light upon the cap E, thereby securing the release of the arms.

Various forms of springs may be used to cause the arms to open out, other than plate springs as illustrated, and means or devices may be adopted to keep the arms opened to their full extent after they have been released.

Many modifications may be made in the details of the apparatus without departing from the distinctive nature of the invention. For instance the form of the arms, more especially of the fluke or palm ends of same may be other than that illustrated in the accompanying drawings.

According to another form or modification of our invention instead of passing our apparatus over a "Boxer" rocket in manner hereinbefore described we may sometimes arrange for the explosive charge necessary for impelling our apparatus to be contained in the tube C. In this arrangement the required attachments, connections, and devices would, to suit the circumstances, be somewhat similarly disposed upon the tube in manner as hereinbefore described, but it is obvious the ends and sides of the tube would then require to be entirely closed so as to form an air-tight case to contain the explosive charge. Our apparatus would then be complete and self contained ready for immediate use at any time without having to pass it over a "Boxer" rocket.

Importance is attached to the method of connecting the arms to, and releasing them from the tube as, and for the purpose specified.

The improvements are more particularly adapted for apparatus designed for throwing lines from a ship to the shore, but it is believed that some of the novel features of our invention may be applied to apparatus used for throwing lines from the shore to a ship, or from the shore or ship into the sea, and for all similar purposes. We may provide a suitable stand upon which the apparatus will be mounted for firing.

Having thus fully described our invention, what we claim therein, and desire to secure by Letters Patent, is—

1. In an apparatus of the character described, the combination with a grapnel or anchor having pivoted extensory flukes or arms, of a cap connected to and adapted to release said flukes when pushed backward, and a spring normally pressing said cap forward, substantially as described.

2. In an apparatus of the character described, the combination with a grapnel or anchor having a shank and pivoted extensory flukes or arms, of springs interposed between said flukes and said shank and normally pressing said flukes outward, means for holding said flukes inward against said springs, and a cap connected to said flukes and movable longitudinally relative to said shank, the said cap being adapted to disengage said flukes from said shank when pressed backward, and so to allow said flukes to spread outward, substantially as described.

3. In an apparatus of the character described, the combination with a grapnel or anchor having a shank and pivoted extensory flukes or arms, of springs interposed between said flukes and said shank and normally pressing said flukes outward, means for holding said flukes inward against said springs, a cap connected to said flukes and movable longitudinally relative to said shank, the said cap being adapted to disengage said flukes from said shank when pressed backward, and a spring interposed between said cap and said shank, substantially as and for the purposes described.

4. In an apparatus of the character described, the combination with a grapnel or anchor having a shank and pivoted extensory flukes or arms, of springs interposed between said flukes and said shank and normally pressing said flukes outward, hooks on said flukes engaging in recesses in said shank for holding said flukes inward against said springs, and a cap connected to said flukes and movable longitudinally relative to said shank, the said cap being adapted to disengage said flukes from said shank when pressed backward, and so to allow said flukes to spread outward, substantially as described.

5. In an apparatus of the character described, the combination with a rocket and lifeline of a grapnel or anchor having pivoted extensory flukes or arms, of a cap connected to and adapted to release said flukes when pushed backward, and a spring normally pressing said cap forward, substantially as described.

6. In an apparatus of the character described, the combination with a rocket and lifeline, of a grapnel or anchor having a shank and pivoted extensory flukes or arms, of springs interposed between said flukes and said shank and normally pressing said flukes outward, means for holding said flukes inward against said springs, and a cap connected to said flukes and movable longitudinally relative to said shank, the said cap being adapted to disengage said flukes from said shank when pressed backward, and so to allow said flukes to spread outward, substantially as described.

7. In an apparatus of the character described, the combination with a rocket and lifeline of a grapnel or anchor having a shank and pivoted extensory flukes or arms, of springs interposed between said flukes and said shank and normally pressing said flukes outward, means for holding said flukes inward against said springs, a cap connected to said flukes and movable longitudinally relative to said shank, the said cap being adapted to disengage said flukes from said shank when pressed backward, and a spring interposed between said cap and said shank, substantially as and for the purposes described.

8. In an apparatus of the character described, the combination with a rocket and lifeline, of a grapnel or anchor having a shank and pivoted extensory flukes or arms, of springs interposed between said flukes and said shank and normally pressing said flukes outward, hooks on said flukes engaging in recesses in said shank for holding said flukes inward against said springs, and a cap connected to said flukes and movable longitudinally relative to said shank, the said cap being adapted to disengage said flukes from said shank when pressed backward, and so to allow said flukes to spread outward, substantially as described.

9. In an apparatus of the character described, the combination with a grapnel or anchor having a shank and pivoted extensory flukes or arms, of a cap connected to said flukes and adapted to release them when said cap is pushed backward, a spring interposed between said cap and said shank and normally pressing said cap forward, a lifeline attached to said shank, and means for projecting said grapnel or anchor with said lifeline attached, substantially as and for the purposes described.

In testimony whereof we affix our signatures in presence of two witnesses.

JAMES BLACKWOOD NOBLE.
CHARLES GEORGE THOMSON.

Witnesses:
W. R. M. DAVIES,
ARTHUR T. DAVIES.